United States Patent

[11] 3,559,551

| [72] | Inventor | Shigeo Ono<br>Yokohama-shi, Japan |
|---|---|---|
| [21] | Appl. No. | 718,162 |
| [22] | Filed | Apr. 2, 1968 |
| [45] | Patented | Feb. 2, 1971 |
| [73] | Assignee | Nippon Kogaku K. K.<br>Tokyo, Japan<br>a corporation of Japan |
| [32] | Priority | Apr. 20, 1967 |
| [33] | | Japan |
| [31] | | 42/24797 and 42/24798 |

[54] EXPOSURE METER FOR A SINGLE LENS REFLEX CAMERA HAVING INTERCHANGEABLE LENSES
7 Claims, 6 Drawing Figs.

[52] U.S. Cl. .................................................. 95/42,
                                                         95/10
[51] Int. Cl. ........................................... G03b 19/12
[50] Field of Search............................. 95/10C, 42

[56] References Cited
UNITED STATES PATENTS

| 2,937,582 | 5/1960 | Goshima | 95/10C |
| 3,082,672 | 3/1963 | Swarofsky et al. | 95/10C |
| 3,094,053 | 6/1963 | Lieser | 95/10C |
| 3,205,796 | 9/1965 | Lieser | 95/10C |
| 3,262,380 | 7/1966 | Winkler | 95/10C |
| 3,332,330 | 7/1967 | Broschke et al. | 95/42 |
| 3,332,331 | 7/1967 | Mandler | 95/42 |
| 3,352,220 | 11/1967 | Lang et al. | 95/10C |
| 3,394,644 | 7/1968 | Ettischer | 95/10C |
| 3,446,126 | 4/1965 | Leitz et al. | 95/10C |

*Primary Examiner* — John M. Horan
*Assistant Examiner* — Richard M. Sheer
*Attorney* — Anton J. Wille ABSTRACT: An exposure meter is provided for a single lens reflex camera having interchangeable lenses in which photometric measurements are made through the camera lenses. A relay optical system is provided between the objective secured to the camera body and the photosensitive surface of the photocell, an adjustable stop being provided in the relay optical system. The adjustable stop is coupled to the stop adjusting mechanism of the particular objective mounted on the camera to provide for the exposure meter a suitable sensitivity relative to the aperture ratio of the objective without varying the area to be measured.

PATENTED FEB 2 1971  3,559,551

EXPOSURE METER FOR A SINGLE LENS REFLEX CAMERA HAVING INTERCHANGEABLE LENSES

This invention relates to an exposure meter of a single lens reflex camera having interchangeable lenses for measuring the light passing through the mounted lens, the diaphragm of which is fully opened.

In photometric measurements made through the lens of a single lens reflex camera, there is an arrangement wherein the light measurements are made with the diaphragm aperture fully opened and another arrangement wherein the measurements are made with the aperture stopped down. With the first arrangement there is an advantage in that the scene observed in the viewfinder is at its brightest. A disadvantage of the open aperture arrangement is that the sensitivity of the exposure meter changes when an interchangeable lens is substituted for the one in use, the second lens having a different aperture ratio. It has been proposed to overcome this disadvantage by positioning the image of the photosensitive element centrally of the exit pupils of the several lenses so that the light rays will not be cut off by any one of the exit pupils. However, the sensitivity of the exposure meter is determined by the lens with the smallest aperture ratio.

According to the latter system, the valve of the aperture ratio of the camera lens is optically interlocked as it is, and as a result, there is an advantage that it is not necessary to mechanically interlock the diaphragm to the exposure meter of the camera. However, the diaphragm must be stopped every time the exposure is measured, and therefore the operation becomes complicated. In this arrangement, the stopping down of the lens from its maximum aperture will not provide the same bright scene in the viewfinder as when the aperture was wide open.

An object of this invention is to remove all these drawbacks of the conventional system, and to provide a very convenient exposure meter for a single lens reflex camera having interchangeable lenses through which photometric measurements are made wherein it is unnecessary to adjust for changes in sensitivity when another lens is substituted.

Another object of this invention is to provide an exposure meter of the character indicated in which the degree of light intensity falling on the photosensitive element is varied as the diaphragm of the camera lens is adjusted, the arrangement being such that the measured portion may be varied and restricted.

In accordance with this invention, an exposure meter is provided for a single lens reflex camera having interchangeable lenses through which photometric measurements are made, wherein a relay optical system is disposed intermediate the objective and the photosensitive element, an adjustable stop being positioned immediately in front of the photosensitive element. The relay system provides a conjugate image of the stop intermediate the different exit pupils of the interchangeable lenses, a coupling interconnecting the stop and the diaphragm ring of the lens mounted on the camera varying the stop opening as the diaphragm opening of the lens is varied.

A further aspect in accordance with the invention is that the adjustable stop of the relay optical system determines the effective aperture ratio of the whole optical system from the camera lens to the photosensitive element, an adjustable field stop being positioned in front of the photosensitive element and adjusted by the adjustable stop coupled to the diaphragm ring of the lens to vary the portion of the scene to be measured.

The present invention will be more apparent from the following description referring to illustrative embodiments shown in the attached drawings, in which.

Figure 1:
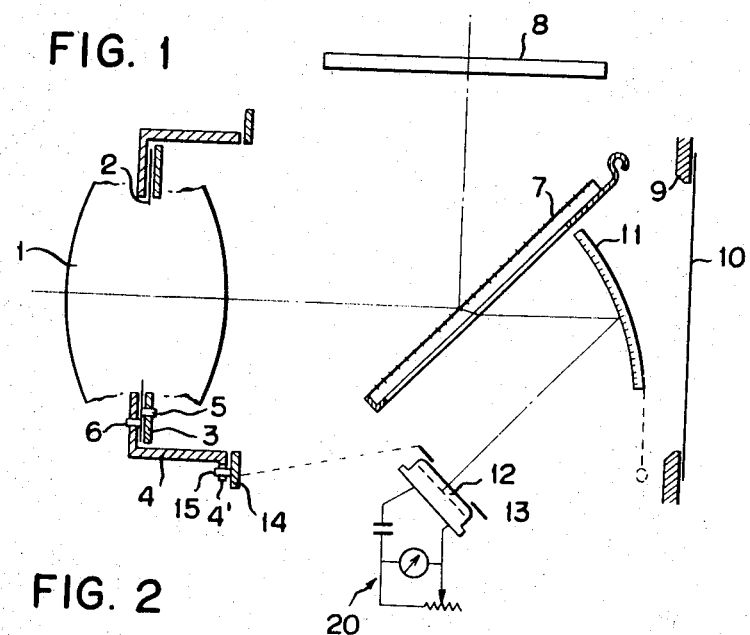
FIG. 1 is a vertical cross-sectional side view of a first embodiment of this invention.
Figure 2:
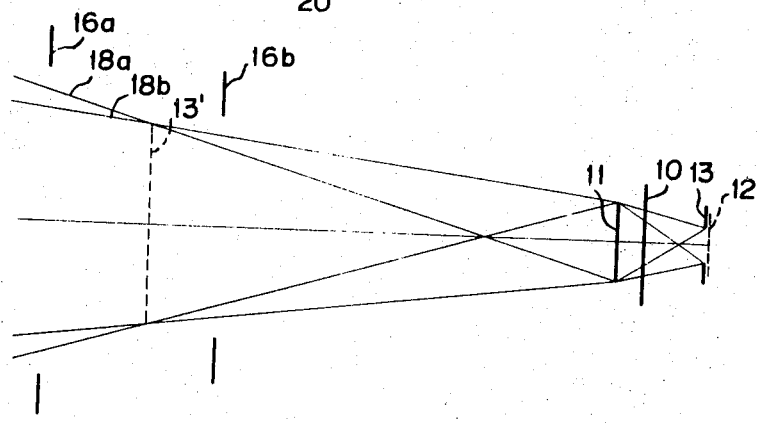
FIG. 2 is a diagram showing the development of the light path of the embodiment of FIG. 1, and shows the case of the exchangeable lens of relatively large diameter.
Figure 3:
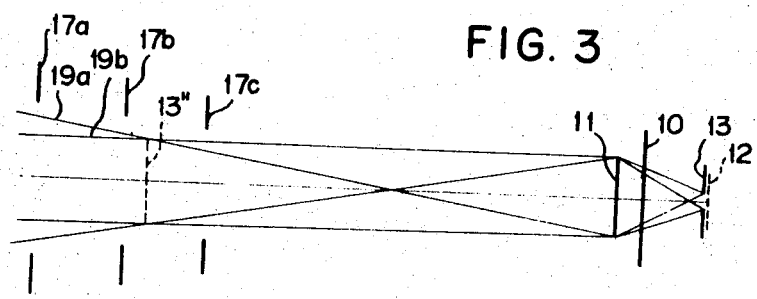
FIG. 3 is the same diagram as FIG. 2, and shows the case of the exchangeable lens of relatively small diameter.

Referring now to FIGS. 1, 2 and 3 of the drawings, the reference numeral 1 designates one of several interchangeable lenses mounted on a camera body, only those portions of the camera being illustrated which are necessary for an understanding of the invention. The camera is provided with a diaphragm 2, a diaphragm ring 3 interlocked to a conventional driving mechanism, and a diaphragm operating ring 4 manually adjustable. Pins 5 and 6 interconnect the rings 3 and 4, respectively, with the diaphragm 2. The diaphragm 2 is fully open except for the duration of shutter operation. When the operating ring 3 is rotated by the driving mechanism prior to shutter operation, the diaphragm aperture is determined by the relative positions of the rings 3 and 4. The driving mechanism for the operating ring may take various forms well known in the art. In one conventional mechanism, the pin 6 is fixed in the camera.

The camera is provided with the usual viewing mirror of the viewfinder and may be semitransparent or partially transparent. As illustrated, the mirror is in its viewing position, an image of the scene to be photographed being focused on the viewing plate 8. The camera body is formed with an image frame 9 for the film 10. Suitable supported within the camera body is a concave mirror 11 disposed behind the viewing mirror and coupled thereto so that the concave mirror and viewing mirror are pivotable from the viewing positions illustrated to a raised position to permit an exposure to be made. Suitable mounted in the camera is a light sensitive element 12 forming a part of an exposure meter circuit 20. An adjustable stop 13 is positioned in front of the element 12 and is coupled as indicated by the dashed line to a diaphragm interlocking ring 14 on the camera, a pin 15 on the interlocking ring being received in a groove 4' of the operating ring 4. Rotation of the operating ring 4 will thus be transmitted to the stop 13 to vary the aperture thereof as the lens diaphragm opening is varied.

In FIGS. 2 and 3 there is illustrated a development of the light rays passing through the interchangeable lenses, FIG. 2 illustrating an example of lenses having a relatively large aperture ratio while FIG. 3 illustrates an example of lenses having a small aperture ratio.

In FIG. 2, the image 13' of the adjustable stop 13 is formed by the concave mirror 11 in the middle of the exit pupils 16a and 16b of lenses with aperture ratios such as f/2. In FIG. 3, the image 13" formed by the concave mirror is illustrated in the middle of exit pupils 17a, 17b, and 17c of lenses having relatively smaller aperture ratios such as f/4.5. The curvature of the concave mirror is so selected that the size and position of the conjugate imates 13' and 13" of the stop 13 is smaller than and in the middle of the corresponding openings of the exit pupils of the various lenses. It will be noted that the various light rays 18a and 18b in FIG. 2 and rays 19a and 19b in FIG. 3 are not cut off or obstructed by any of the lens exit pupils. The relationship of the operating ring 4 and adjustable stop 13 is so selected that when the operating ring is changed by one stop, the aperture of the stop 13 is varied to change the value of the light incident on the light sensitive element.

The output of the light sensitive element 12 in the exposure meter circuit 20 will include the effects of a predetermined aperture ratio of the objective lens used and the brightness of the object. The light passing through the stop 13 may be introduced to the element 13 through an integrator such as a Ulbricht sphere permitting the use of a very small light sensitive element and adjustable stop.

Figure 4:
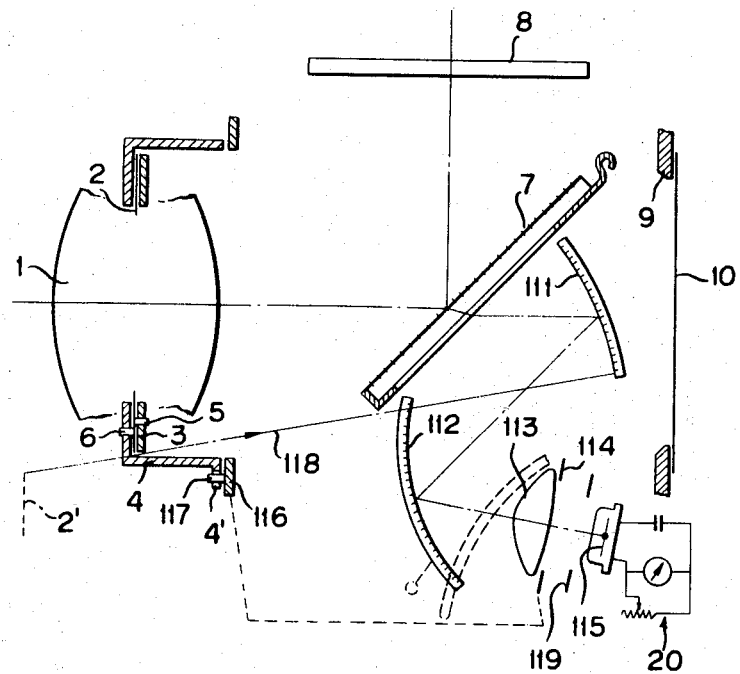
FIG. 4 is a vertical cross-sectional side view of a second embodiment.
Figure 5:
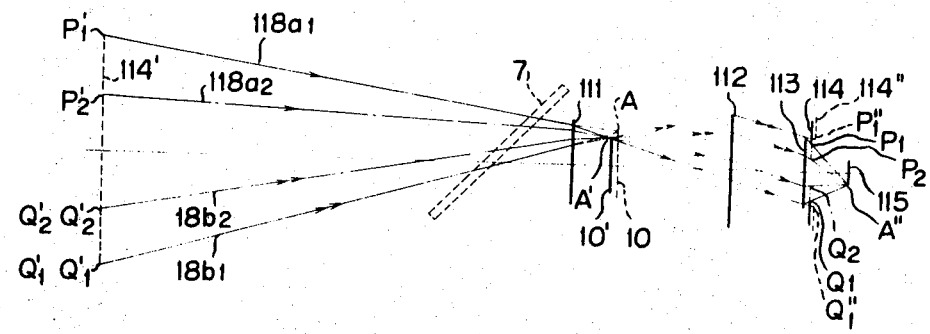
FIG. 5 is a diagram showing the development of the light path of the embodiment of FIG. 4.

In FIG. 4 there is illustrated a second embodiment of the invention in which two concave mirrors 111 and 112 are provided, the two mirrors being coupled to the viewing mirror 7 and movable therewith. A lens 113 is provided in front of the light sensitive element 115, an adjustable stop 114 being coupled to a diaphragm adjusting ring 116 coupled through a pin 117 to the operating ring 4 through the slot 4'. The mirrors 111 and 112 and lens 113 from a relay optical system with the adjustable stop 114 determining the aperture of the system. With reference to FIG. 5, it will be noted that the conjugate image 114' of the adjustable stop 114 is formed almost in the middle of the exit pupils of the interchangeable lenses and is smaller than exit pupils.

It will be noted in FIG. 5, that when the adjustable stop 114 is set at $P_1Q_1$ by the operating ring 4, the image 114' becomes $P_1'Q_1'$. The light rays $118_{a1}$ and $118_{b1}$, respectively, directed towards the portion A to be measured are refracted by the reflecting mirror 111 and pass through Point A', and again refracted by the reflecting mirror 112 to proceed towards the images $P''_1$ and $Q''_1$, and are refracted again by the relay lens 113 and pass through $P_1$ and $Q_1$ to be collected at Point $A''$. Therefore, the brightness of the whole optical system relative to Point $A''$ can be determined by $< P_1A'' Q_1$, i.e. determined by the size of the light receiving diaphragm 114.

FIG. 5 also shows the adjustable stop 114 when it is stopped to $P_2Q_2$ and the light collected at Point $A''$ becomes the bundle of light rays surrounded by the light rays $118a_2$ and $118b_2$ coming from $P'_2$ and $Q'_2$, respectively. As is apparent from the diagram the size of the portion to be measured as shown at 10' is not changed regardless of the size of the adjustable stop 114.

Figure 6:
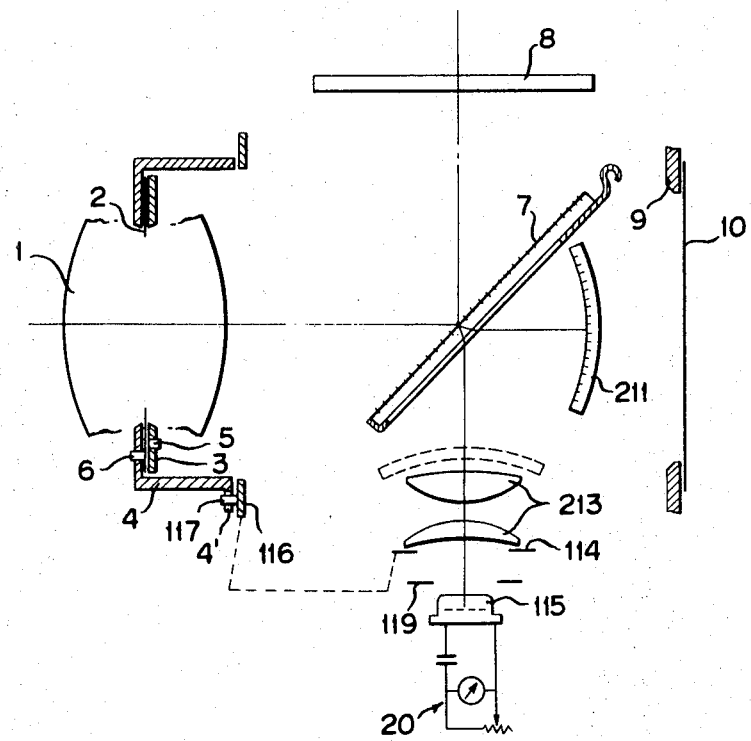
FIG. 6 is a vertical cross-sectional side view of a third embodiment of this invention.

Fig. 6 is the vertical side view of the third embodiment of this invention. What is different from the second embodiment shown in FIG. 4 is that the light reflected by the concave mirror 211 is again reflected by the semitransparent mirror 7, to be introduced into the relay lens 213. The reference characters given to the respective portions are the same as in FIG. 1 and FIG. 4. According to this embodiment, the aberrations of the relay optical system may be greatly improved.

It will be appreciated, that the aperture of the stop 114 can be fixed, the size of the aperture being such that none of the light rays incident on the light sensitive element are cut off by the exit pupils of the interchangeable lenses. Further, when a field stop 119 is provided in front of the light sensitive element 115 so as to the conjugate with the plane of film 10 and is adjusted as to aperture, it is possible to select the portion to be measured.

Furthermore the adjustable stop 114 can be made so that the size thereof can be determined by the relative positions of the two plates for supporting the stopping blades, and one of the supporting plates is interlocked to the diaphragm adjusting ring 4 of the camera lens, and the other is interlocked to the field stop 119 in front of the photosensitive element for changing the portion to be measured. According to this structure, while the portion to be measured is adjusted, the sensitivity of the exposure meter can be kept unchanged. In this case too, it is necessary that the adjustable stop 114 determines the effective aperture ratio of the entire light measuring optical system.

Having thus described the invention it will be obvious that when the invention is employed: 1. It is possible to observe through the viewfinder the image of the scene brightly illuminated. 2. It becomes unnecessary to adjust the sensitivity of the exposure meter each time a lens is changed even though the interchangeable lenses are of different maximum aperture ratios. 3. An exposure meter of higher sensitivity can be obtained than in conventional exposure meters. 4. It becomes unnecessary to provide mechanical interlocks between the diaphragm operating ring and the circuit of the exposure meter, particularly the variable resistance elements. 5. It is possible to maintain the area of the portion measured unchanged regardless of the sizes and positions of the exit pupils of the interchangeable lenses. 6. The illumination of the light sensitive element is increased by the relay optical system so that the illumination of the viewing plate will not be lowered.

When the diaphragm operating ring 4 of the camera lens is set on an aperture smaller than the maximum aperture ratio of the slowest interchangeable lens, correction may be made by varying the value of the resistor in the exposure meter circuit or making a cam adjustment for resetting the meter pointer instead of changing the aperture of the stop 13 or 114 interlocked with ring 4. The first three advantages given above will still be obtained, in this instance the change in the adjustable stops being held within a very small range.

It will be readily appreciated by those skilled in the art that while the foregoing invention has been described in connection with a coupling between the stop of the relay optical system and the diaphragm operating rings of the interchangeable lenses, other adjustable parameters for obtaining proper exposure values may be used, as for example, the shutter speed, or the film speed of the film used in the camera for coupling with the adjustable stop.

I claim:

1. A single lens reflex camera provided with a semitransparent viewing mirror, interchangeable objective lenses and an exposure meter responsive to light passed through each of the objective lenses mounted on the camera, comprising:

a light sensitive element of the exposure meter;

a relay optical system arranged between each of the objective lenses and said light sensitive element so that an image of an object to be photographed is formed on said light sensitive element;

an adjustable stop having an aperture therein for determining the effective F number of the light passing through each of the objective lenses, the viewing mirror, and the relay optical system;

an actuating member for setting an exposure parameter in taking an exposure reading; and means coupling said adjustable stop to said actuating member for setting the aperture of said adjustable stop.

2. A single lens reflex camera according to claim 1, wherein the adjustable stop is positioned in front of said light sensitive element so that the conjugate image of said stop is substantially intermediate the different pupils of each of the interchangeable lenses.

3. A single lens reflex camera according to claim 1, wherein the actuating member is a diaphragm operating ring on each of the interchangeable lenses.

4. A single lens reflex camera according to claim 1, wherein the relay optical system includes a concave mirror positioned behind, coupled to and movable with, the viewing mirror of the camera.

5. A single lens reflex camera according to claim 1, wherein the relay optical system includes two concave mirrors positioned behind, coupled to and movable with, the viewing mirror of the camera, the light rays passing through each of the objective lenses, passing through the viewing mirror and being reflected first from one concave mirror to the other concave mirror and then to the light sensitive element, and a lens disposed between the other of said concave mirrors and the adjustable stop.

6. A single lens reflex camera according to claim 5, wherein a field stop is positioned between said lens and said adjustable stop.

7. A single lens reflex camera according to claim 4, wherein the light rays passing through each of the objective lenses, passing through the viewing mirror and being reflected from the concave mirror back toward the rear of the viewing mirror where it is reflected toward the light sensitive element, and at least one lens interposed in the light path from the reflecting mirror to the light sensitive element.